Patented Nov. 11, 1930

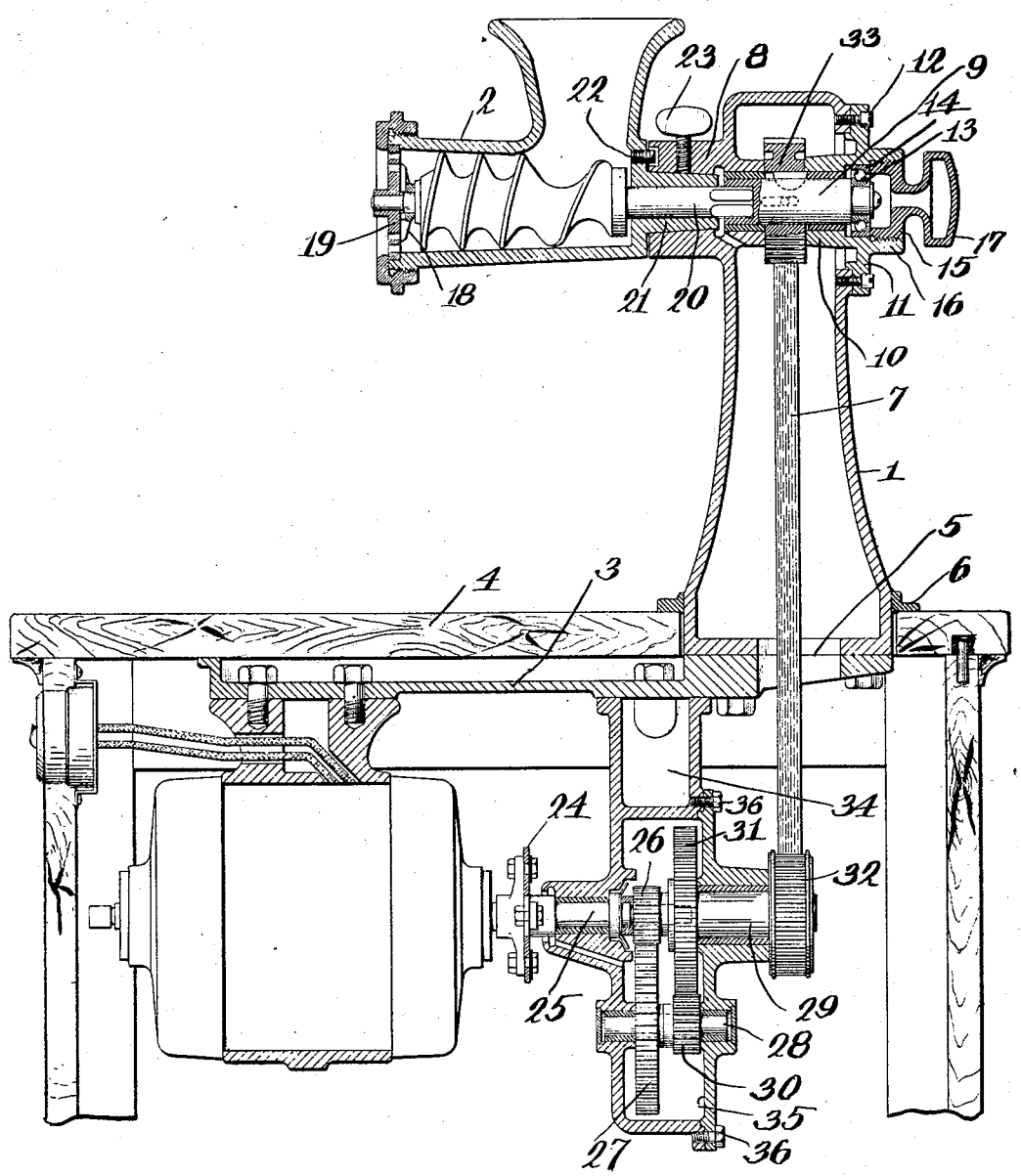

1,780,914

UNITED STATES PATENT OFFICE

ROY KARL GULLBERG, OF DAYTON, OHIO, ASSIGNOR TO DAYTON SCALE COMPANY, OF DAYTON, OHIO, A CORPORATION OF NEW JERSEY

MEAT CHOPPER

Application filed June 3, 1925. Serial No. 34,571.

This invention relates to meat choppers and more particularly to their mode of operation and construction.

The object of this invention is to provide a meat chopper capable of being easily and quickly detached from a table and which is driven by a motor mounted on a frame beneath the table.

Another object is to design the meat chopper so that its driving mechanism shall be fully protected and render an interference therewith or injury therefrom impossible.

Another object is to provide a thrust bearing for the meat chopper which is independent of the meat advancing screw so that no particles of meat can become lodged within the bearing and interfere with its function, the screw also being subject to removal for cleaning purposes without disturbing the setting of the bearing.

Another object is to provide a thrust bearing which may be easily removed from its supporting structure, and, when in position, be conveniently adjusted by external appurtenances.

Further and other objects will appear hereinafter as the invention is disclosed and claimed.

The illustration which discloses the present invention which I now consider to be the preferred form comprises a pedestal or column 1 for a meat chopper 2 mounted on a frame 3 secured to the bottom side of a table top 4 by any suitable means, such as screws. The lower end of the pedestal sits firmly upon a finished face 5 of the frame and its cylindrical end fits closely within ring 6 which may be fastened to the table top. The pedestal is sufficiently long to permit the placing of ordinary containers under the chopper and its shank is hollow for the purpose of enclosing a driving chain or belt 7. At the top of the hollow column which is closed, is hub portion 8 for supporting the chopper 2 and the left end of a short shaft 9. The other end of this shaft is supported in a hub 10 in a circular plate 11 which is fastened to the pedestal by means of machine screws 12.

The usual sleeves of bearing metal are provided between the shaft and supporting hubs. The right hand end of shaft 9 is of smaller diameter than the central bearing length and it carries a race ring 13 and a disk to hold said ring in place. Encircling this ring is another ring 14 which may be moved axially of its axis in an annular recess in plate 11. This last named ring is designed to take all axial thrust exerted by the meat advancing screw on shaft 9 and the ball bearings and its position is adjustable by means of a nut or follower 15 threaded in hub 16 of plate 11. This nut may be rotated by a knurled knob 17 to the desired longitudinal setting of shaft 9. By the provision of a knurled knob 17 by means of which longitudinal adjustment of shaft 20 may be made, the operator is enabled to vary the fineness of cut without the use of a special tool by merely turning the knob situated at the end of the shaft opposite the cutting blades. This adjustment may be made during operation and without the necessity for cleaning the various parts such as blades 18 and disc 19.

The front end of the meat advancing screw carries the usual knives 18 and is journaled in a perforated disk 19, and the other end has a stem 20 mounted to turn loosely in hub 21. Stem 20 has flat surfaces for engaging corresponding surfaces within a recess in the end of shaft 9 so that when this shaft is driven the screw will be rotated. The chopper itself is held from rotary motion by a fixed screw 22 and its dislodgment from the pedestal is prevented by a winged screw 23.

The motor used may be of any standard construction and it is suspended from frame 3 by means of screws. A flexible coupling consisting of a fibrous material 24 forms the connecting means between the rotor shaft and shaft 25 to which is secured pinion 26 which drives gear 27 on countershaft 28. The right end of shaft 25 is journaled in shaft 29 which is coaxial. Turning with gear 27 is a pinion 30 which drives shaft 29 by means of gear 31. To shaft 29 is fixed a gear or sprocket wheel 32, which transmits motion to gear 33 fixed to shaft 9 by means of a connecting noiseless chain or belt 7. Gear 33 is fixed to shaft 9 slidably by means of key 40 so that shaft 9 may be moved longitudinally in accordance with the adjustment of a thrust bearing without causing axial movement of the gear wheel.

Shafts 25, 28 and 29 are suitably mounted in a frame casting 34 and cover-plate 35. For disassembling these gears the cover plate may be removed and screws 36 are provided for facilitating whatever access is necessary.

What I claim is:

1. In a grinder wherein a shaft is provided co-axial with and driving a feed screw for the meat, a casing having a reduced portion in which said shaft is journaled, a bearing element carried by one end of the shaft, a cooperating bearing element carried by the casing, friction-reducing elements positioned between the bearing elements, a gear keyed to the shaft for rotating the shaft, said casing having an enlarged portion surrounding the gear and said reduced portion of the casing for accommodating the gear, and said bearing elements being formed with vertical and horizontal walls to resist radial and end thrusts of the shaft.

2. In a grinder such as defined in claim 1, said casing terminating in a reduced collar internally threaded, and a finger knob threaded to cooperate with the collar threads and having its inner end engaged with one of the bearing elements and adapted to thereby axially adjust the shaft and the feed screw said gear being slidably keyed to the shaft to permit the axial adjustment of the latter.

In testimony whereof I hereto affix my signature.

ROY KARL GULLBERG.